United States Patent
Masuda et al.

(10) Patent No.: US 7,104,601 B2
(45) Date of Patent: Sep. 12, 2006

(54) VEHICLE OCCUPANT RESTRAINT SYSTEM

(75) Inventors: Ko Masuda, Yokohama (JP); Takashi Takeshita, Yokohama (JP); Hiroshi Matsunaga, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 126 days.

(21) Appl. No.: 10/613,737

(22) Filed: Jul. 1, 2003

(65) Prior Publication Data

US 2004/0055806 A1 Mar. 25, 2004

(30) Foreign Application Priority Data

Jul. 2, 2002 (JP) ............................. 2002-193073

(51) Int. Cl.
*B60N 2/42* (2006.01)
(52) U.S. Cl. .................. 297/216.1; 297/284.11
(58) Field of Classification Search ............. 297/216.1, 297/284.11
See application file for complete search history.

(56) References Cited

U.S. PATENT DOCUMENTS

| | | | |
|---|---|---|---|
| 2,736,566 A * | 2/1956 | Hartl ........................... | 280/29 |
| 3,550,953 A * | 12/1970 | Neale ......................... | 297/312 |
| 3,858,930 A * | 1/1975 | Calandra et al. ........... | 296/68.1 |
| 4,334,709 A * | 6/1982 | Akiyama et al. ......... | 297/284.11 |
| 4,652,049 A * | 3/1987 | Maruyama et al. ...... | 297/284.11 |
| 5,556,160 A * | 9/1996 | Mikami ................... | 297/216.1 |
| 5,558,399 A * | 9/1996 | Serber ...................... | 297/284.4 |
| 6,050,635 A * | 4/2000 | Pajon et al. .............. | 297/216.1 |
| 6,352,312 B1 * | 3/2002 | Rees .......................... | 297/470 |
| 6,386,631 B1 * | 5/2002 | Masuda et al. ........... | 297/216.1 |
| 6,450,573 B1 * | 9/2002 | Yamaguchi et al. ..... | 297/216.1 |
| 6,837,540 B1 * | 1/2005 | Yamaguchi et al. ..... | 297/216.1 |
| 2002/0003365 A1 | 1/2002 | Yamaguchi et al. | |

FOREIGN PATENT DOCUMENTS

| | | |
|---|---|---|
| DE | 100 11 818 A1 | 11/2000 |
| DE | 199 61 799 A1 | 7/2001 |
| JP | 05229378 A * | 9/1993 |
| JP | 05286386 A * | 11/1993 |
| JP | 05286387 A * | 11/1993 |
| WO | WO-0145985 A1 * | 6/2001 |

* cited by examiner

*Primary Examiner*—Peter M. Cuomo
*Assistant Examiner*—Joseph Edell
(74) *Attorney, Agent, or Firm*—MacPherson Kwok Chen & Heid LLP; David S. Park

(57) ABSTRACT

In a vehicle occupant restraint system for restraining a lower part of a vehicle occupant, an arrangement for moving a restraining member from a retracted position to a deployed position upon detection and/or prediction of a vehicle crash by a crash sensor is adapted in such a manner that the restraining member cannot be made to move from the deployed position to the retracted position by an external force applied to the restraining member but can be made to move from the retracted position to the deployed position and from the deployed position back to the retracted position by a force transmitted from a power actuator to the restraining member via a power transmitting member. Thus, while the restraining member is capable of withstanding the load of restraining the vehicle occupant, even when the restraining member is deployed, it can be brought back to the retracted position so that the restraining system can be used repeatedly. This is particularly significant when the crash sensor includes a crash prediction sensor because the prediction could be wrong and the restraining member may have to be deployed a number of times even when a vehicle crash has never occurred.

5 Claims, 6 Drawing Sheets

VEHICLE OCCUPANT RESTRAINT SYSTEM

TECHNICAL FIELD

The present invention relates to a vehicle occupant restraint system which is adapted to be incorporated in a vehicle seat, and in particular to a vehicle occupant restraint system which can restrain a lower part of the vehicle occupant in combination with an existing vehicle occupant restraint system for restraining an upper part of the vehicle occupant in case of an impact situation such as a vehicle crash.

BACKGROUND OF THE INVENTION

Passenger vehicles are commonly equipped with restraint systems, typically in the form of seat belts, for restraining primarily an upper part of the vehicle occupant in case of a frontal crash. However, it is known that the vehicle occupant may submarine or slip forward under the seat belt at the time of a vehicle crash. This can occur if the seat belt fails to restrain the pelvic part of the vehicle occupant for various reasons, and severely impairs the capability of the seat belt to restrain the vehicle occupant. Also, it is important to restrain the vehicle occupant at an early time point as possible to ensure the safety of the vehicle occupant at the time of a vehicle crash. Air bags are another form of such restraining systems for restraining an upper part of the vehicle occupant.

Restraint systems for restraining a lower part of the vehicle occupant have been proposed in various forms. Such an example is illustrated in FIG. 8. A laterally extending restraining pipe member 32 is pivotally supported on either lateral end thereof with respect to a seat frame 33 by arm members 34, and a power actuator 35 for vertically upwardly moving the corresponding arm member 34 provided on one of the side walls of the seat frame 33. The restraining pipe member 32 is normally situated under a front part of a seat bottom cushion 31. The power actuator 35 is incorporated with a pyrotechnical actuator for driving the restraining pipe member 32 upward along with the corresponding part of the seat bottom cushion 31. The lower part of the vehicle occupant can be thus engaged by the restraining pipe member 32 which is raised at the time of a crash, and the vehicle occupant is thereby prevented from submarining.

However, according to this previous proposal, owing to the use of a pyrotechnical actuator, once the restraint system is actuated, it is not possible to restore the restraint system back to the original state. Therefore, once the restraint system is actuated, the vehicle seat becomes unfit for any subsequent use although the seat may be otherwise in a prime condition.

In recent years, vehicle occupant restraint systems based on prediction of an occurrence of a vehicle crash have been proposed. In such a system, the restraint system needs to be actuated when a vehicle crash is likely to happen, but it is also possible that the prediction turns out to be wrong. In other words, it is very possible that the restraint system is actuated a number of times without experiencing any actual vehicle crash. Therefore, the restraint system of this kind is desired to be suited for repeated actuation. At the same time, the restraint system is capable of withstanding the load of restraining the vehicle occupant at the time of a vehicle crash.

BRIEF SUMMARY OF THE INVENTION

In view of such problems of the prior art, a primary object of the present invention is to provide a vehicle occupant restraining system for preventing submarining of the vehicle occupant which is suited for repeated actuation.

A second object of the present invention is to provide a vehicle occupant restraining system which is simple in structure but capable of providing an adequate mechanical strength for restraining the vehicle occupant at the time of a vehicle crash.

According to the present invention, such objects can be accomplished by providing a vehicle occupant restraint system for restraining a lower part of a vehicle occupant, comprising: a restraining member supported by a seat frame so as to be moveable between a retracted position leaving a seat bottom in an undisturbed state and a deployed position for restraining a lower part of a vehicle occupant by projecting a part of the seat bottom upward from a normal surface of the seat bottom; a crash sensor for detecting and/or predicting an occurrence of a vehicle crash; and a power actuator for moving the restraining member from the retracted position to the deployed position via a power transmitting member upon detection and/or prediction of a vehicle crash by the crash sensor in such a manner that the restraining member cannot be made to move from the deployed position to the retracted position by an external force applied to the restraining member but can be made to move from the retracted position to the deployed position and from the deployed position back to the retracted position by a force transmitted from the power actuator to the restraining member via the power transmitting member.

Thus, while the restraining member is capable of withstanding the load of restraining the vehicle occupant, even when the restraining member is deployed, it can be brought back to the retracted position so that the restraining system can be used repeatedly. This is particularly significant when the crash sensor includes a crash prediction sensor because the prediction could be wrong and the restraining member may have to be deployed a number of times even when a vehicle crash has never occurred.

According to a preferred embodiment of the present invention, the crash sensor additionally comprises a simple crash sensor for detecting an actual occurrence of a vehicle crash, and the control unit is adapted to actuate the power actuator so as to raise the restraining member to the partly deployed position according to an output of the crash prediction sensor and to raise the restraining member to the fully deployed position according to an output of the simple crash sensor. Thus, when a crash is only predicted, the restraining member is deployed only partially so that the vehicle occupant is not excessively inconvenienced by the deployment of the restraining member. If an actual crash should occur after a crash has been predicted, because the restraining member is already partly deployed, the restraining member can reach the fully deployed position in a very short period of time after the occurrence of the actual crash.

According to a particularly preferred embodiment of the present invention, the restraining member comprises a laterally extending member located under the seat bottom at a substantially longitudinally middle point of the seat bottom, and a pair of arms pivotally supporting the laterally extending member with respect to a seat frame. Additionally, the power transmitting member comprises a threaded rod extending in a fore-and-aft direction and rotatably supported by a moveable member which is guided by the seat frame so as to be moveable in a fore-and-aft direction, and a nut fixedly attached to the seat frame and threadably engaging the threaded rod, the arms being pivotally supported by the movable member and being provided with an arcuate slot receiving a pin fixedly attached to the seat frame. Most preferably, the power actuator comprises an electric motor having an output shaft extending laterally under the seat bottom, and the moveable member comprises a gear box for transmitting a rotation of the output shaft to the threaded rod. This arrangement allows the vehicle occupant restraint system to be incorporated in a vehicle seat in a highly compact manner.

According to another embodiment of the present invention, the power transmitting member comprises a threaded rod and a nut threadably engaging the threaded rod, and the power actuator comprises an electric motor for turning one of the threaded rod and nut, the other of the threaded rod and nut being drivingly connected to the restraining member. Additionally, the threaded rod is connected to the restraining member, and the power actuator comprises a pyrotechnical actuator which is adapted to move the threaded rod in a direction to deploy the restraining member while the electric motor is adapted to turn the threaded rod, the nut comprising a split piece which is normally urged by a spring member against a slanted surface of a guide member in such a manner that the nut is normally placed in a threadable engagement with the threaded rod when the threaded rod is turned in a normal direction to move the restraining member toward the deployed position and is allowed to move freely with respect to the threaded rod when the threaded rod is actuated by the pyrotechnical actuator in the direction to deploy the restraining member. The pyrotechnical actuator ensures an extremely rapid deployment of the restraining member, and this arrangement allows the use of such a pyrotechnical actuator without compromising the benefit of the present invention. More specifically, the vehicle occupant restraint system implemented in this fashion can be used repeatedly simply by replacing the pyrotechnical actuator (if it has been actuated) without replacing the remaining part of the system.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
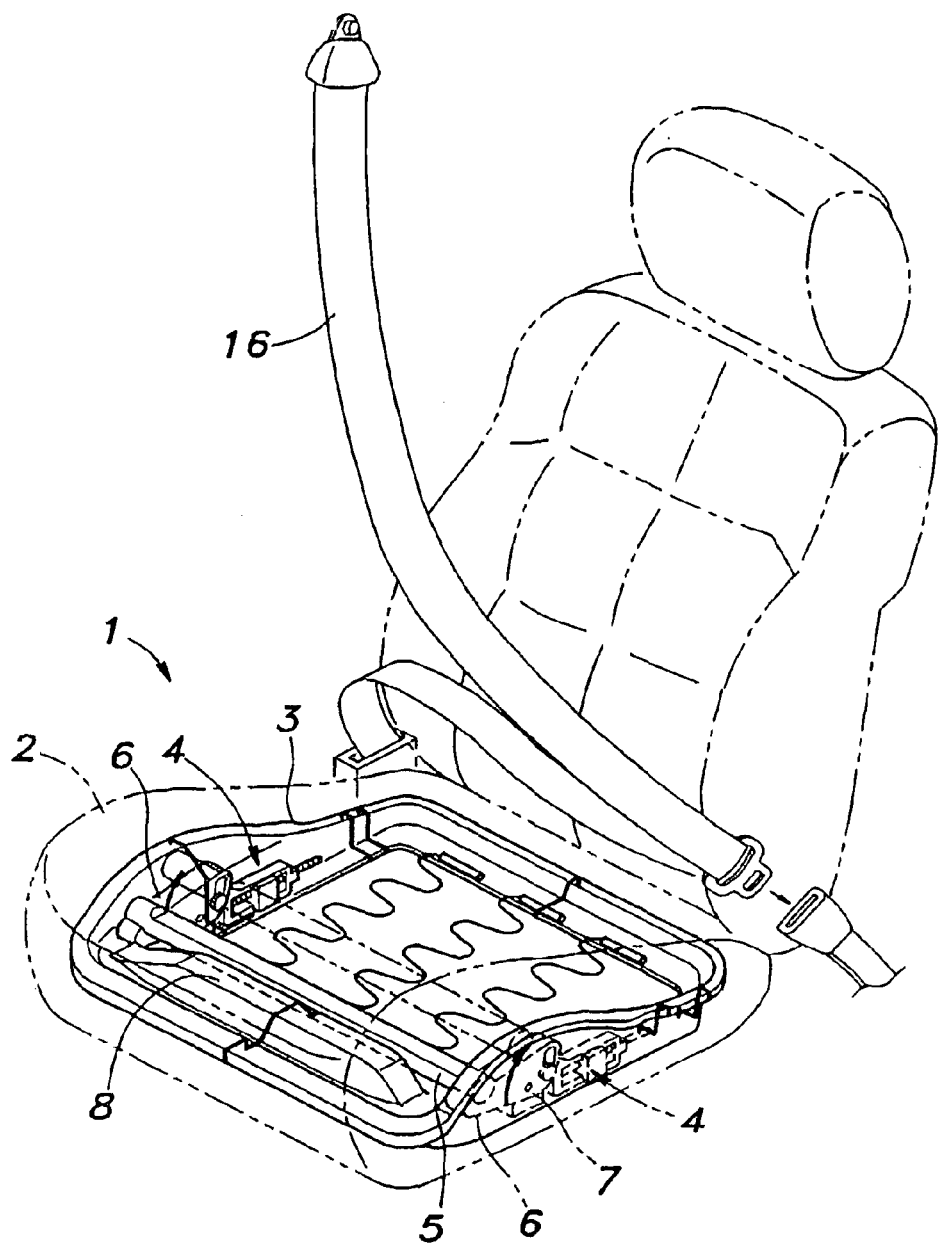
FIG. 1 is a perspective view of a vehicle seat embodying the present invention.

FIG. 1 is a perspective view of a vehicle seat 1 embodying the present invention. The seat 1 comprises a seat bottom 2 made of plastic foam, and a rectangular dish-shaped seat frame 3 for supporting the lower part of the scat bottom 2. A pair of power actuators 4 are attached to either side wall of the seat frame 3 and form a part of a vehicle occupant restraint system. A restraining pipe member 5 extends laterally under an intermediate part of the seat bottom 2, preferably only slightly ahead of the longitudinally middle point of the seat bottom 2.

Figure 2:
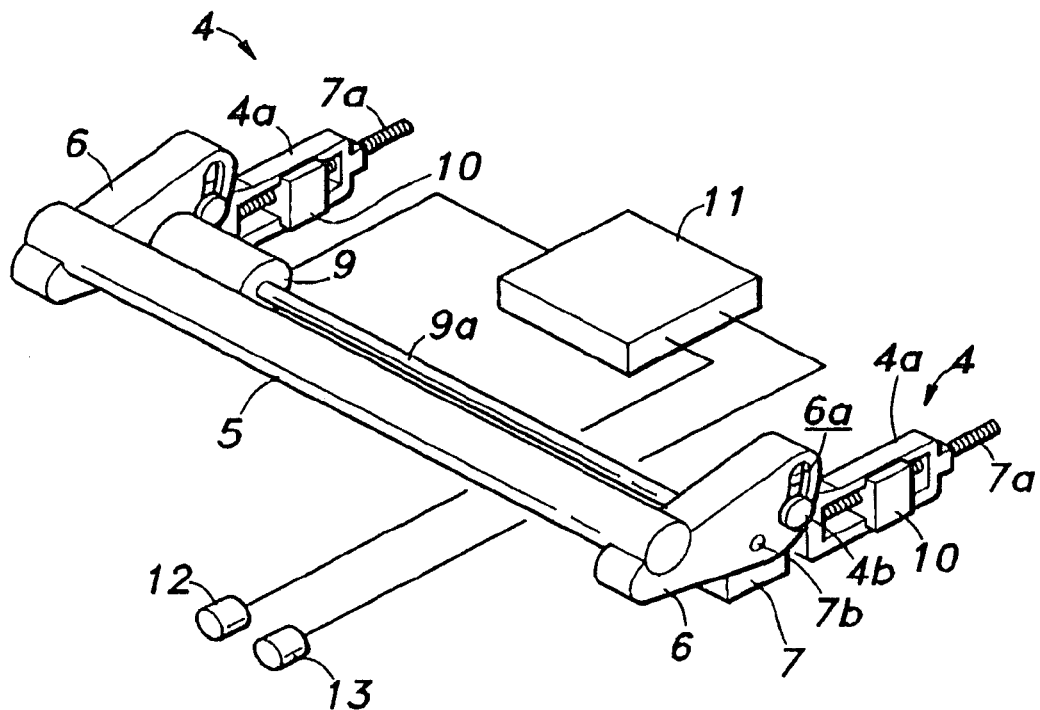
FIG. 2 is a fragmentary perspective view of the vehicle occupant restraint system according to the present invention.

A pair of arm members 5 are attached to the corresponding ends of the restraining pipe member 5, respectively. As best shown in FIG. 2, an intermediate point of each arm member 6 is pivotally attached to a gear box 7 via a pivot shaft 7b. As will be described hereinafter, the gear boxes 7 are slidably attached to the seat frame 3 although it is not shown in the drawing. Thus, the restraining pipe member 5 can move vertically as a result of the pivoting motion of the arm members 6 around the pivot shafts 7b. The restraining pipe member 5 engages the thighs of the vehicle occupant at the time of a vehicle crash and prevents the hip and waist of the vehicle occupant from slipping forward on the surface of the seat bottom 2. The restraining pipe member 5 may be adapted to undergo plastic deformation or other controlled deformation so as to absorb the impact when engaging the vehicle occupant.

Referring to FIG. 1, a laterally elongated upward projection 8 is formed along the front edge of the seat frame 3 in front of the restraining pipe member 5 so as to provide a continuous support surface for the front part of the seat bottom 2 in cooperation with the restraining pipe member 5. Therefore, when the restraining pipe member 5 is in the illustrated retracted position, the front part of the seat bottom 2 presents a smooth continuous surface, and the thighs of the vehicle occupant are not subjected to any localized pressure which could impair the comfort of the vehicle occupant.

An electric motor 9 is placed between the right and left gear boxes 7, and the drive shaft 9a of the electric motor 9 is passed into the gear boxes 7. A threaded rod 7a extends from a rear end of each gear box 7 at right angle with respect to the drive shaft 9a. Each gear box 7 is internally provided with a pair of bevel gears which transmit the torque of the drive shaft 9a to the corresponding threaded rod 7a.

Figure 3A:
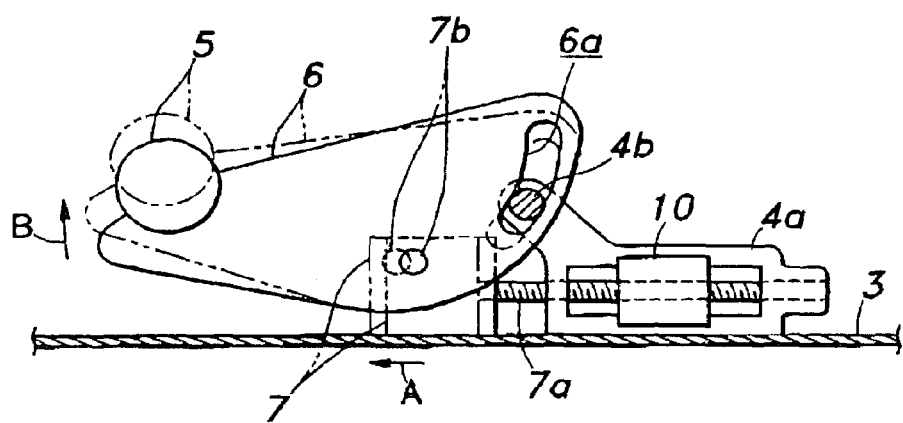
FIG. 3a is a fragmentary side view of the vehicle occupant restraint system showing the initial state and the partially deployed position.

A cage member 4a is fixedly secured to each side wall of the seat frame 3 by using threaded bolts or the like not shown in the drawings, and a nut member 10 is fixedly attached to the cage member 4a. Each threaded bolt 7a meshes with the corresponding nut member 10 while the gear box 7 is supported by the seat frame 3 so as to be slidable in the fore-and-aft direction. The base end of each arm member 6 is provided with an arcuate slot 6a, and a pin 4b provided on an extension of the cage member 4a is received in the arcuate slot 6a. As best shown in FIG. 3a, the pivot pin 7b is located lower than the restraining pipe member 5.

When the electric motor 9 is activated in the normal direction, and the threaded bolts 7a are turned, the threaded bolt 7a are moved in the forward direction as they mesh with the nut members 10 which are fixedly secured to the seat frame 3 via the cage members 4a. This in turn causes the pivot pins 7b to move forwardly relative to the seat frame 3 while the rear ends of the arm members 6 are each constrained by the engagement between the pin 4b and arcuate slot 6a, and the restraining pipe member 5 to be raised vertically. In this connection, the motion of the restraining pipe member 5 may be made substantially linear in the upward direction because the restraining pipe member 5 moves rearward with respect to the pivot pins 7b as it follows a circular path around the pivot pins 7b while the pivot pins 7b along with the gear boxes 7 move forward with respect to the seat frame 3. In particular, by suitably selecting the shape of the arcuate slots 6a, the motion of the restraining pipe member 5 may be made substantially linear in the upward direction.

The electric motor 9 is controlled by the control unit 11 which is in turn connected to a crash sensor 12 and a crash prediction sensor 13. The crash sensor 12 typically consists of an acceleration sensor, and the crash prediction sensor 13 may consist of a laser radar although other sensors may also be used. Typically, the control unit 11 receives information on objects detected by the crash prediction sensor 13 and makes a prediction by taking into account the traveling speed of the vehicle and other data.

In this vehicle occupant restraint system, when the control unit 11 has judged that a vehicle crash is possible according to the detection signal from the crash prediction sensor 13, the control unit 11 supplies a drive signal to the electric motor 9 to slightly raise the restraining pipe member 5 or to raise the restraining pipe member 5 at a relatively low speed. The electric motor 9 accordingly turns the drive shaft 9a in the normal direction, and this is converted into the turning of the threaded rods 7a in a prescribed direction. Because each nut member 10 is fixed to the seat frame 3 via the cage member 4a, the gear boxes 7 move forward with respect to the seat 1 as indicated by arrow A in FIG. 3a. Preferably, the gear boxes 7 and electric motor 9 may be mounted on a common slide plate not shown in the drawing so as to be moveable in the fore-and-aft direction in unison. As a result, the restraining pipe member 5 is rotated as indicated by arrow B in FIG. 3a, and reaches a slightly raised position (as indicated by the imaginary lines) with respect to the original position (indicated in the solid lines).

Thereafter, if no crash is detected by the crash sensor 12, the electric motor 9 is turned in the reverse direction, and the restraining pipe member 5 is brought back to the original position.

Figure 3B:
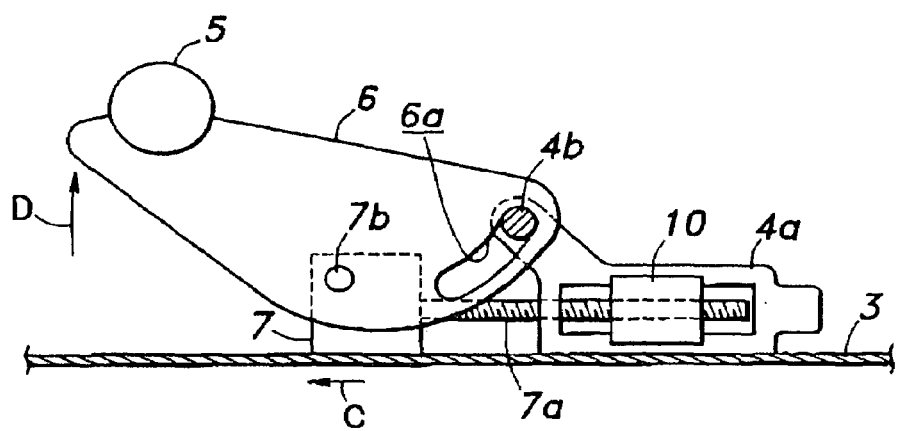
FIG. 3b is a view similar to FIG. 3a showing the fully deployed position.

Conversely, if an actual crash is detected by the crash sensor 12, the electric motor 9 is turned further in the normal direction so that the gear boxes 7 are moved forward as indicated by arrow C and the restraining pipe member 5 is rotated in the direction indicated by arrow D as shown in FIG. 3b. As a result, the restraining pipe member 5 is raised to the fully deployed position. Because the restraining pipe member 5 is already slightly raised when the restraining pipe member 5 is about to be fully raised, it requires a substantially less time for the restraining pipe member 5 to reach the fully raised position than the time required for the restraining pipe member 5 to reach the fully raised position from the original position indicated by the solid lines in FIG. 3a. Therefore, the vehicle occupant restraint system can restrain the vehicle occupant in a short period of time after the occurrence of a vehicle crash is detected by the crash sensor 12.

If desired, the control unit 11 may be adapted in such a manner that the restraining pipe member 5 is raised to the fully deployed position when the crash prediction sensor 13 has predicated the occurrence of a vehicle crash. This allows the restraining pipe member 5 to be fully deployed before the actual occurrence of a vehicle crash.

When deployed, the restraining pipe member 5 substantially directly acts upon the pelvis of the vehicle occupant who is thrown forward by the inertia upon the occurrence of a vehicle crash so that the lower part of the vehicle occupant including the hip and waist of the occupant is effectively prevented from moving forward or the submarining of the vehicle occupant can be avoided.

Figure 4A:
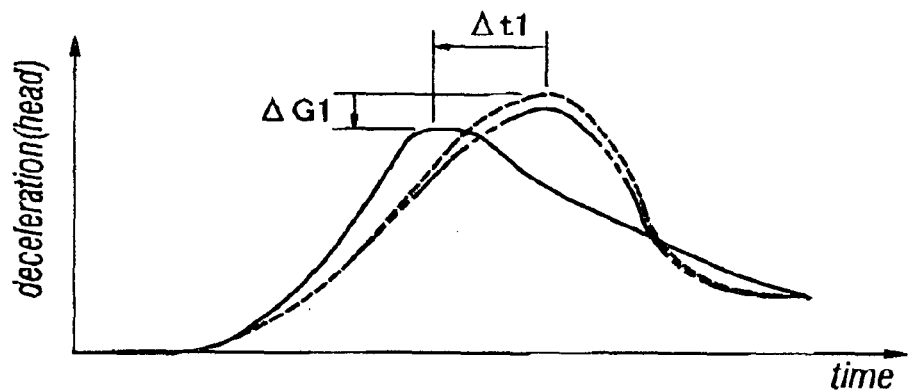
FIGS. 4a to 4c are graphs showing the time histories of deceleration of various body parts of the vehicle occupant.
Figure 4B:
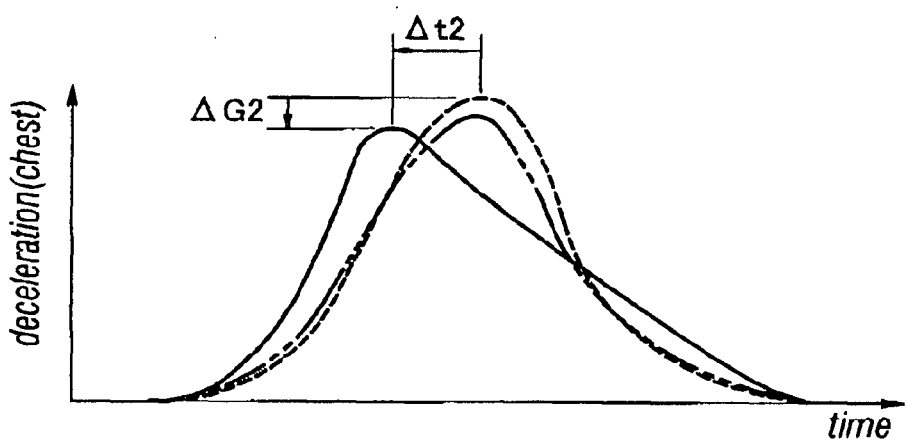
Figure 4C:
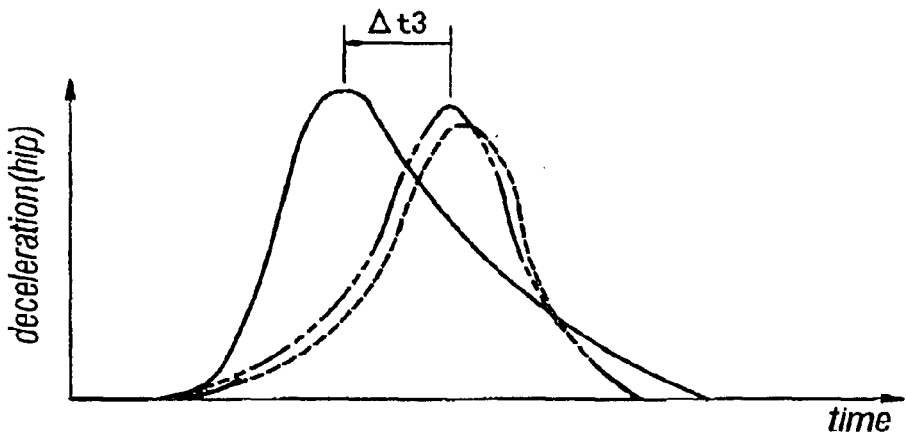

FIGS. 4a to 4c are graphs showing the time histories of the deceleration of various human body parts. The solid lines correspond to the case where the vehicle occupant restraint system according to the present invention was employed in combination with a seat belt. The broken lines correspond to the case where only a seat belt was used for restraining the vehicle occupant. The imaginary lines correspond to the case where a more conventional restraining system which raises a front end of a seat was used in combination with a seat belt.

As demonstrated by these graphs, the present invention allows the deceleration of the hip of the vehicle occupant to start in an early phase of the crash as compared with the other two cases. According to the present invention, the peaks of deceleration of the hip of the vehicle occupant occurred earlier than those of the other conventional cases (by $\Delta t3$). The same is true with the decelerations of the head and chest of the vehicle occupant. The peaks of the decelerations of the head and chest also occurred earlier (by $\Delta t1$ and $\Delta t2$, respectively). Furthermore, the peak values of the deceleration of the head and chest were lower than those of the conventional cases by $\Delta G1$ and $\Delta G2$, respectively.

Because the lower part of the vehicle occupant is prevented from moving forward at the time of a crash, injuries resulting from the collision of the feet and knees of the vehicle occupant with the instrument panel or other fixtures of the passenger compartment can be avoided. Also, because the acceleration levels of various parts of the vehicle occupant rise early in the crash, the peak levels of the deceleration acting on the vehicle occupant can be reduced. This is highly beneficial because the peak deceleration level substantially dictates the severity of the injury to the vehicle occupant.

When no crash has occurred in spite of a prediction of a crash, or when the crash sensor 12 fails to produce any detection signal within a prescribed time period following a prediction signal (that has caused the restraining pipe member 5 to be slightly raised), the electric motor 9 is turned in the reverse direction, and the restraining pipe member 5 is brought back to the original position. Thus, the seat bottom 2 is brought back to the original state, and the vehicle occupant can continue to operate the vehicle undisturbed. If the seat bottom 2 is suitable adapted, even when the restraining pipe member 5 is actuated into the fully deployed position, the seat bottom 2 can be brought back to the original state, and continued to be used as before. Thus, the vehicle occupant restraint system of the present invention can be constructed so as to be actuated repeatedly without any problem.

Figure 5:
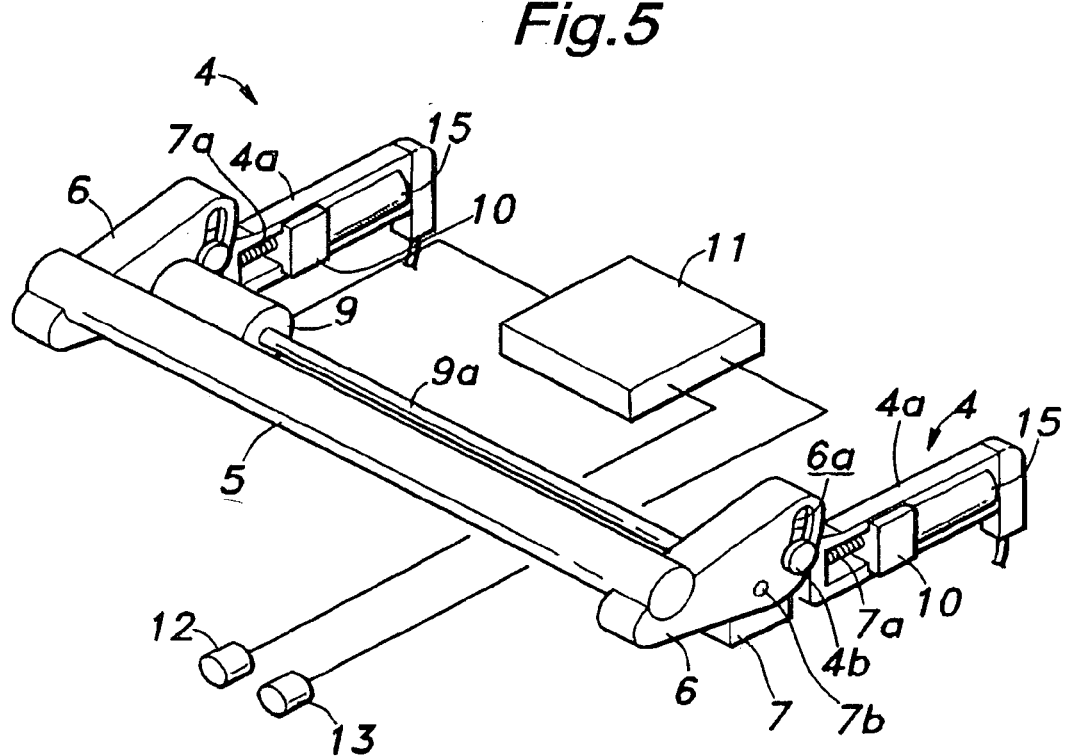
FIG. 5 is a view similar to FIG. 2 showing a second embodiment of the present invention.

FIGS. 5 and 6 show a second embodiment of the present invention. In these drawings, the parts corresponding to those of the preceding embodiment are denoted with like numerals without repeating the description of such parts. The second embodiment employs a combination of a one-way lock mechanism 14 and a pyrotechnical actuator 15 provided in the rear end of the one-way lock mechanism, instead of the combination of the threaded rod 7a and nut member 10. The pyrotechnical actuator 15 may be provided only on one side of the vehicle occupant restraint system or on each side of the vehicle occupant restraint system.

Figure 7:
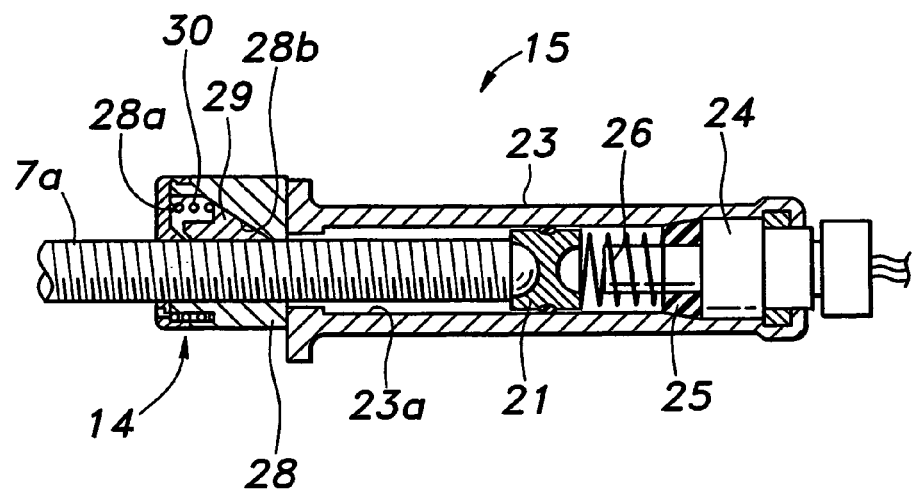
FIG. 7 is a sectional side view showing the pyrotechnical actuator incorporated with a one-way lock mechanism that can be used in the second embodiment.
Figure 8:
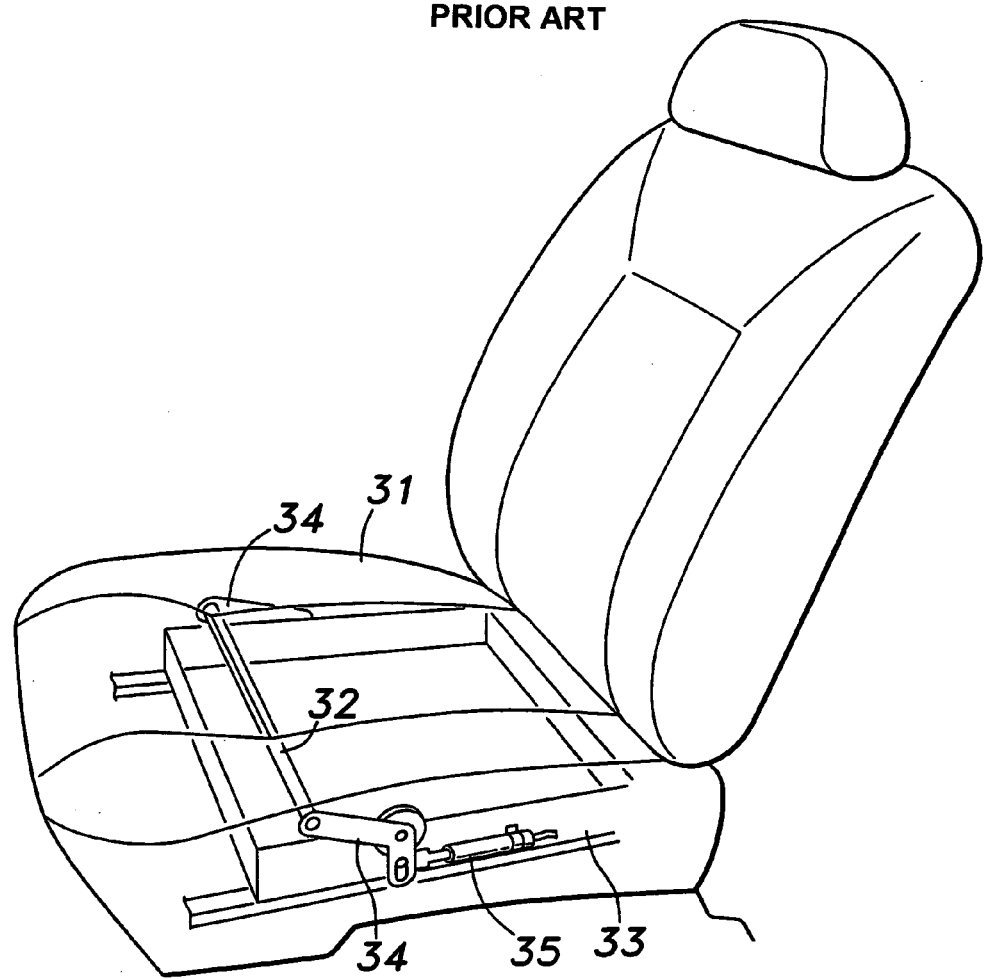
FIG. 8 is a perspective view showing a conventional vehicle occupant restraint system.

The cage member 4a fixedly secures the pyrotechnical actuator 15. As best shown in FIG. 7 which shows the one-way lock mechanism 14 and pyrotechnical actuator 15 in somewhat more detail, the pyrotechnical actuator 15a comprises a cylinder 23 having a piston 21 received in an inner bore thereof in a slidable manner. A gas generator 24 is received in a bottom end or rear end of the cylinder 23. The rear end of the threaded rod 7a is received in the cylinder 23 and abuts the piston 21 (in a relatively rotatable manner).

An elastomeric seal member 25 and compression coil spring 26 are interposed between the piston 21 and gas generator 24. The compression coil spring 26 normally urges the piston 21 in the direction of activation (or in the forward direction). The seal member 25 provides a resiliency in the axial direction, and prevents leakage of gas when the gas generator 24 is activated.

The one-way lock mechanism 14 is provided on the front end of the cylinder 23. The one-way lock mechanism 14 comprises a casing 28 fixedly attached to the front end of the cylinder 23 around the threaded rod 7a, an engagement piece 29 having an internally threaded section that engages the thread of the threaded rod 7a, and a spring 30 received in the casing 28 to urge the engagement piece 29 toward the cylinder 23 or rearward.

The inner bore of the casing 28 comprises a large diameter portion 28a and a tapered portion 28b connected to the rear end of the large diameter portion 28a and progressively diminishes in diameter away from the large diameter portion 28a, and part of the outer circumferential surface of the engagement piece 29 makes a surface contact with the inner surface of the tapered portion 28b. Therefore, in the assembled state illustrated in FIG. 7, the engagement piece 29 is urged against the slanted inner surface of the tapered portion 29, and this in turn causes the threaded section of the engagement piece 29 to be urged against the thread of the threaded rod 7a.

Therefore, when the threaded rod 7a is moved forward (leftward in the drawing), the engagement piece 29 is allowed to move in unison with the piston 21 against the spring force of the spring 30. Once the engagement piece 29 reaches the large diameter portion 28a, the engagement piece 29 is substantially disengaged from the threaded rod 7a, the threaded rod 7a along with the piston 21 is allowed to move freely. Conversely, when the threaded rod 7a is forced into the cylinder 23, the engagement piece 29 is urged against the tapered portion 28b, and this in turns forces the engagement piece 29 into firm engagement with the thread of the threaded rod 7a. Therefore, the threaded rod 7a is held fixed in position relative to the cylinder 23. In the illustrated embodiment, only one engagement piece 29 was used, but a plurality of such engagement pieces may be used so as to engage the threaded rod 7a substantially over the entire circumference. If desired, the reverse rotation of the motor 9 may be done away with. For instance, the drive shaft of the motor 9 may be turned in the reverse direction manually by using a suitable tool.

The mode of operation of the second embodiment is described in the following. The control process for the second embodiment up to the point where the crash prediction sensor indicates a possibility of a vehicle crash is not different from that of the previous embodiment. In other words, when a crash is predicted, the motor 9 turns the threaded rods 7a in the normal direction. This causes the engagement piece 29 to be pushed toward the cylinder 23 so that the engagement piece 29 performs the function of the nut member 10 of the previous embodiment, and the gear boxes 7 move forward, thereby causing the restraining pipe member 5 to be slightly raised as indicated by the imaginary lines in FIG. 6a. If there was no vehicle crash in spite of the prediction, the electric motor 9 is turned in the reverse direction, and the restraining pipe member 5 is brought back to the original position.

When a vehicle crash is actually detected by the crash sensor 12, the gas generator 24 is activated, and the resulting rise in the inner pressure of the cylinder 23 forces the piston 21 out of the cylinder 23 or forward. Thereby, the threaded rod 7a is pushed forward. The forward movement of the threaded rod 7a is effected substantially without any resistance because the forward movement of the threaded rod 7a disengages the engagement piece 29 away from the threaded rod 7a. The forward movement of the threaded rod 7a rotates the arm 6 around of the pivot shaft of the gear box 7, and the restraining pipe member 5 is raised above the seat 1 as shown in FIG. 6b.

Figure 6A:
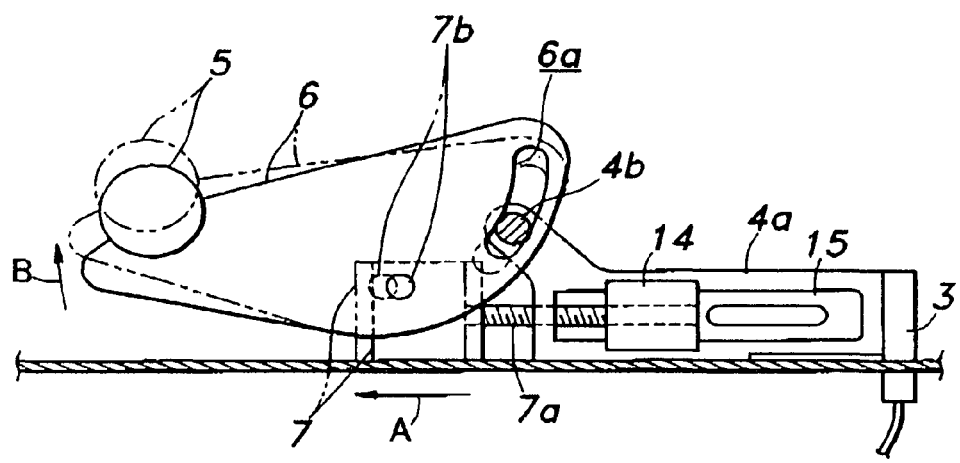
FIGS. 6a and 6b are views of the second embodiment similar to FIGS. 3a and 3b, respectively.
Figure 6B:
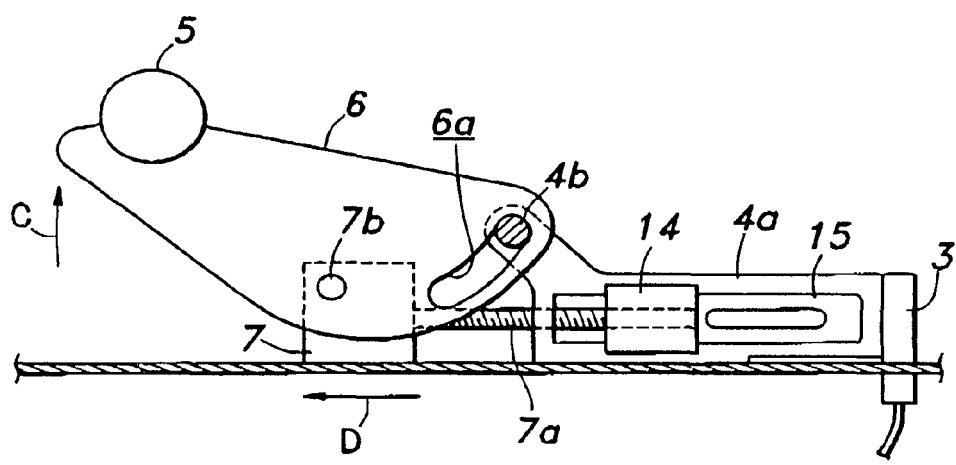

In this embodiment also, because the restraining pipe member 5 is already slightly raised when the restraining pipe member 5 is about to be fully raised, it requires a substantially less time for the restraining pipe member 5 to reach the fully raised position than the time required for the restraining pipe member 5 to reach the fully raised position from the original position indicated by the solid lines in FIG. 6a. Therefore, the vehicle occupant restraint system can restrain the vehicle occupant in a short period of time after the occurrence of a vehicle crash is detected by the crash sensor 12.

When the gas generator 24 has ceased to produce gas, the drive force of the pyrotechnical actuator 15 is lost. However, the one-way lock mechanism retains the restraining pipe member 5 in the raised position. When the restraining pipe member 5 is adapted to undergo a controlled deformation, it can absorb the impact of the deployment of the restraint system and the vehicle crash itself, and control the deceleration of the vehicle occupant in a favorable manner in cooperation with the seat belt.

The pyrotechnical actuator 15 may be provided either only on one side of the seat 1 or on each side of the seat 1. When two pyrotechnical actuators are used, each actuator may be smaller than that to be provided only on one side of the seat 1. This may be beneficial to the end of incorporating the restraint system to the seat in a highly unobtrusive and compact manner.

Although the present invention has been described in terms of preferred embodiments thereof, it is obvious to a person skilled in the art that various alterations and modifications are possible without departing from the scope of the present invention which is set forth in the appended claims.

The invention claimed is:

1. A vehicle occupant restraint system for restraining a lower part of a vehicle occupant, comprising:
   a restraining member supported by a seat frame so as to be moveable between a retracted position leaving a seat bottom in an undisturbed state and a deployed position for restraining a lower part of a vehicle occupant by projecting a part of said seat bottom upward from a normal surface of said seat bottom,
   wherein said restraining member comprises a laterally extending member located under said seat bottom at a substantially longitudinally middle point of said seat bottom, and a pair of arms pivotally supporting said laterally extending member with respect to said seat frame;
   a crash sensor for detecting an occurrence of a vehicle crash;
   a crash prediction sensor that provides data for predicting an occurrence of a vehicle crash;

a power actuator including a cylinder fixedly supported by said seat frame and having an open end and a closed end, a gas generator received in said closed end of said cylinder, a piston received in said cylinder, a piston rod having one end engaging said piston and another end projecting out of said open end of said cylinder, said piston rod including a threaded section and supported so as to be rotatable around an axial line thereof, a nut member threadably engaging said threaded section of said piston rod and supported by said seat frame against a reaction force of said piston rod axially moving into said cylinder and an electric motor adapted to turn said piston rod around said axial line thereof, wherein said cylinder is provided on a side part of said seat frame and extends in a fore-and-aft direction and said piston rod is rotatably supported by a moveable member which is guided by said seat frame so as to be moveable in a fore-and-aft direction, said arms being pivotally supported by said moveable member and being provided with an arcuate slot receiving a pin fixedly attached to said seat frame so as to effect a pivotal upward movement of said arms by a forward travel of said moveable member;

a power transmitting mechanism for converting an axial movement of said piston rod into a movement of said restraining member toward said deployed position; and a control unit for activating said electric motor to cause said restraining member to a partly deployed position upon prediction of an occurrence of a vehicle crash according to said data from said crash prediction sensor, said control unit returning said restraining member from said partly deployed position back to said retracted position upon failure to detect an actual crash by said crash sensor, and fully deploying said restraining member from said partly deployed position upon detection of an actual crash by said crash sensor.

2. A vehicle occupant restraint system according to claim 1, wherein the nut member abuts said open end of said cylinder.

3. A vehicle occupant restraint system according to claim 1, wherein said nut member comprises a split piece which is normally urged by a spring member against a slanted surface of a guide member which is supported by said seat frame against a reaction force of said piston rod axially moving into said cylinder in such a manner that said split piece is normally placed in a threadable engagement with said threaded section of said piston rod when said piston rod is turned in a normal direction to move said restraining member toward said deployed position and allows the piston rod to move freely in the axial direction when said piston rod is actuated by a pyrotechnical actuator in said direction to deploy said restraining member.

4. A vehicle occupant restraint system according to claim 3, wherein the guide member abuts said open end of said cylinder.

5. A vehicle occupant restraint system according to claim 1, wherein said power actuator comprises an electric motor having an output shaft extending laterally under said seat bottom, and said moveable member comprises a gear box for transmitting a rotational movement of said output shaft to said piston rod.

* * * * *